United States Patent
Lehwalder et al.

(10) Patent No.: US 7,376,854 B2
(45) Date of Patent: May 20, 2008

(54) SYSTEM FOR ENABLING AND DISABLING VOLTAGE REGULATOR CONTROLLER OF ELECTRONIC APPLIANCE ACCORDING TO A SERIES OF DELAY TIMES ASSIGNED TO VOLTAGE REGULATOR CONTROLLERS

(75) Inventors: Philip R. Lehwalder, Hillsboro, OR (US); Erik W. Peter, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 10/816,438

(22) Filed: Mar. 31, 2004

(65) Prior Publication Data

US 2005/0223259 A1 Oct. 6, 2005

(51) Int. Cl.
*G06F 1/26* (2006.01)

(52) U.S. Cl. .................. 713/330; 713/300

(58) Field of Classification Search ......... 713/300, 713/310, 330; 327/143
See application file for complete search history.

(56) References Cited

U.S. PATENT DOCUMENTS

| | | | | |
|---|---|---|---|---|
| 5,677,849 A | * | 10/1997 | Smith | 713/300 |
| 5,913,068 A | * | 6/1999 | Matoba | 713/322 |
| 5,996,083 A | * | 11/1999 | Gupta et al. | 713/322 |
| 6,333,650 B1 | * | 12/2001 | Amin et al. | 327/143 |
| 6,425,086 B1 | | 7/2002 | Clark et al. | |
| 6,665,802 B1 | * | 12/2003 | Ober | 713/320 |
| 6,792,553 B2 | * | 9/2004 | Mar et al. | 713/330 |
| 7,080,273 B2 | * | 7/2006 | Brown et al. | 713/330 |
| 7,111,183 B1 | * | 9/2006 | Klein et al. | 713/330 |
| 2002/0087906 A1 | | 7/2002 | Mar et al. | |
| 2002/0184547 A1 | * | 12/2002 | Francis et al. | 713/322 |
| 2003/0131268 A1 | * | 7/2003 | Kolinummi et al. | 713/300 |
| 2003/0227642 A1 | | 12/2003 | Anderson et al. | |
| 2004/0019814 A1 | * | 1/2004 | Pappalardo et al. | 713/300 |

FOREIGN PATENT DOCUMENTS

| | | | |
|---|---|---|---|
| JP | 2002236527 | * | 8/2002 |
| WO | WO 96/11431 | | 4/1996 |

OTHER PUBLICATIONS

Patent Abstracts of Japan, vol. 2002, No. 12, Dec. 12, 2002 JP2002236527.
PCT ISR & WO dated Nov. 8, 2005.
Int'l application No. PCT/US2005/010594 filed Mar. 28, 2005; Int'l Prliminary Report on Patentability mailed Oct. 12, 2006.

* cited by examiner

*Primary Examiner*—Chun Cao
(74) *Attorney, Agent, or Firm*—David L. Guglielmi

(57) ABSTRACT

In some embodiments, a method, apparatus and system for enabling and disabling voltage regulator controllers are generally presented. In this regard, a sequencer agent is introduced to selectively enable or disable the outputs of voltage regulator controllers in an electronic appliance based at least in part on settings stored in non-volatile memory. Other embodiments are discussed and claimed.

6 Claims, 2 Drawing Sheets

US 7,376,854 B2

SYSTEM FOR ENABLING AND DISABLING VOLTAGE REGULATOR CONTROLLER OF ELECTRONIC APPLIANCE ACCORDING TO A SERIES OF DELAY TIMES ASSIGNED TO VOLTAGE REGULATOR CONTROLLERS

FIELD OF THE INVENTION

Embodiments of the present invention generally relate to the field of voltage sequencing, and, more particularly to a method, apparatus and system for enabling and disabling voltage regulator controllers.

BACKGROUND OF THE INVENTION

When a silicon component is introduced, there is often much testing that must take place to determine the proper ramp rates and sequences of operating voltage levels for reliable performance. Typically, these ramp rates and sequences are set in hardware through the use of resistors, capacitors, and the like. Not only do these solutions add to the overall cost of the electronic circuit board, but also make it difficult to make any changes to the hardware if the sequences need to be altered.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention are generally directed to a method, apparatus and system for enabling and disabling voltage regulator controllers. In this regard, in accordance with but one example implementation of the broader teachings of the present invention, a sequencer agent is introduced. In accordance with but one example embodiment, the sequencer agent employs an innovative method to selectively enable or disable the outputs of voltage regulator controllers in an electronic appliance based at least in part on settings stored in non-volatile memory. According to one example method, the sequencer agent may retrieve delay times to wait before enabling or disabling particular voltage regulator controllers. According to another example method, the sequencer agent may lock out the power supply to prevent power supply state changes until the voltage regulator controller outputs have been stabilized.

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
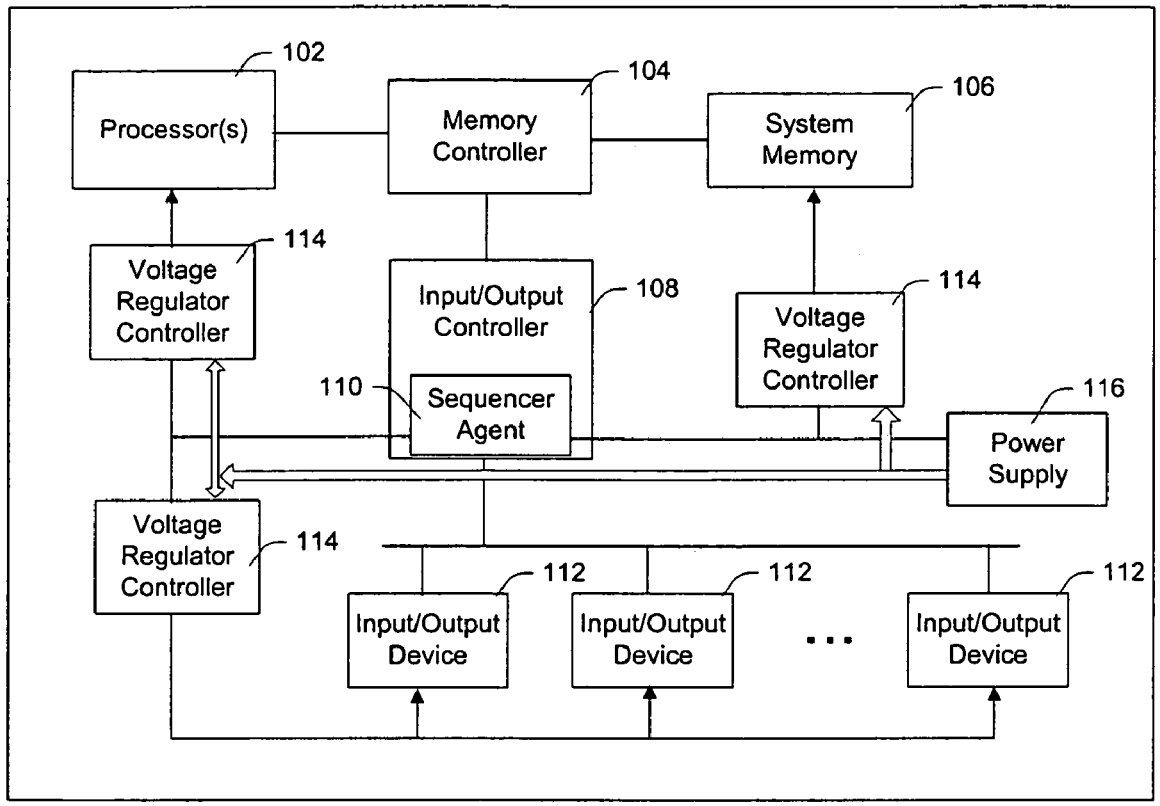
FIG. 1 is a block diagram of an example electronic appliance suitable for implementing the sequencer agent, in accordance with one example embodiment of the invention.

FIG. 1 is a block diagram of an example electronic appliance suitable for implementing the sequencer agent, in accordance with one example embodiment of the invention. Electronic appliance 100 is intended to represent any of a wide variety of traditional and non-traditional computing systems, servers, network switches, network routers, wireless communication subscriber units, wireless communication telephony infrastructure elements, personal digital assistants, set-top boxes, or any electric appliance that would benefit from the teachings of the present invention. In accordance with the illustrated example embodiment, electronic appliance 100 may include one or more of processor(s) 102, memory controller 104, system memory 106, input/output controller 108, sequencer agent 110, input/output devices 112, voltage regulator controllers 114, and power supply 116 coupled as shown in FIG. 1. Sequencer agent 110, as described more fully hereinafter, may well be used in electronic appliances of greater or lesser complexity than that depicted in FIG. 1. Also, the innovative attributes of sequencer agent 110 as described more fully hereinafter may well be embodied in any combination of hardware, on or off an electronic circuit board, and software.

Processor(s) 102 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect. Processor(s) 102 may receive one or more operating voltages from one or more voltage regulator controllers 114.

Memory controller 104 may represent any type of chipset or control logic that interfaces system memory 106 with the other components of electronic appliance 100. In one embodiment, the connection between processor(s) 102 and memory controller 104 may be referred to as a front-side bus. In another embodiment, memory controller 104 may be referred to as a north bridge. Memory controller 104 may receive one or more operating voltages from one or more voltage regulator controllers 114.

System memory 106 may represent any type of memory device(s) used to store data and instructions. Typically, though the invention is not limited in this respect, system memory 106 will consist of dynamic random access memory (DRAM). In one embodiment, system memory 106 may consist of Rambus DRAM (RDRAM). In another embodiment, system memory 106 may consist of double data rate synchronous DRAM (DDRSDRAM). System memory 106 may receive one or more operating voltages from one or more voltage regulator controllers 114.

Input/output (I/O) controller 108 may represent any type of chipset or control logic that interfaces I/O device(s) 112 with the other components of electronic appliance 100. In one embodiment, I/O controller 110 may comply with the Peripheral Component Interconnect (PCI)-X Protocol Addendum to the PCI Local Bus Specification, Revision 2.0a, PCI Special Interest Group, released Jul. 22, 2003. In another embodiment, I/O controller 110 may be referred to as a south bridge. I/O controller 108 may receive one or more operating voltages from one or more voltage regulator controllers 114.

Sequencer agent 110 may have an architecture as described in greater detail with reference to FIG. 2. Sequencer agent 110 may also perform one or more methods for enabling and disabling voltage regulator controllers 114, such as the method described in greater detail with reference to FIG. 3. While shown as being part of I/O controller 108, sequencer agent 110 may well be part of another component or may be implemented in software or a combination of hardware and software.

Input/output (I/O) device(s) 112 may represent any type of device, peripheral or component that provides input to or processes output from electronic appliance 100. In one embodiment, though the present invention is not so limited, at least one I/O device 112 may be a network interface controller. I/O devices 112 may receive one or more operating voltages from one or more voltage regulator controllers 114.

Voltage regulator controllers 114 may represent any type of component that receive one or more voltages from power supply 116 and provide one or more operating voltages to other components of electronic appliance 100. In one embodiment, voltage regulator controllers 114 have output enable inputs, through which sequencer agent 110, for example, can enable or disable the voltage regulator controller output. In another embodiment, voltage regulator controllers 114 may have ramp rate inputs, through which sequencer agent 110, for example, can set the ramp rates for the output voltages. In other embodiments, the ramp rates of voltage regulator controllers 114 output voltages are determined by external hardware components.

Power supply 116 may represent any type of power source that provides input voltages to voltage regulator controllers 114. Power supply 116 may convert alternating current voltage, such as from a conventional outlet, to one or more direct current voltages. In other embodiments, power supply 116 may receive power from a battery. Power supply 116 may provide a standby voltage while not providing all available voltages as when fully functioning. This standby voltage may allow sequencer agent 110 to function in advance of a power on event. In one embodiment, power supply 116 may have a lockout input, through which sequencer agent 110, for example, can prevent power supply state changes before voltage regulator controllers 114 are within tolerance.

Figure 2:
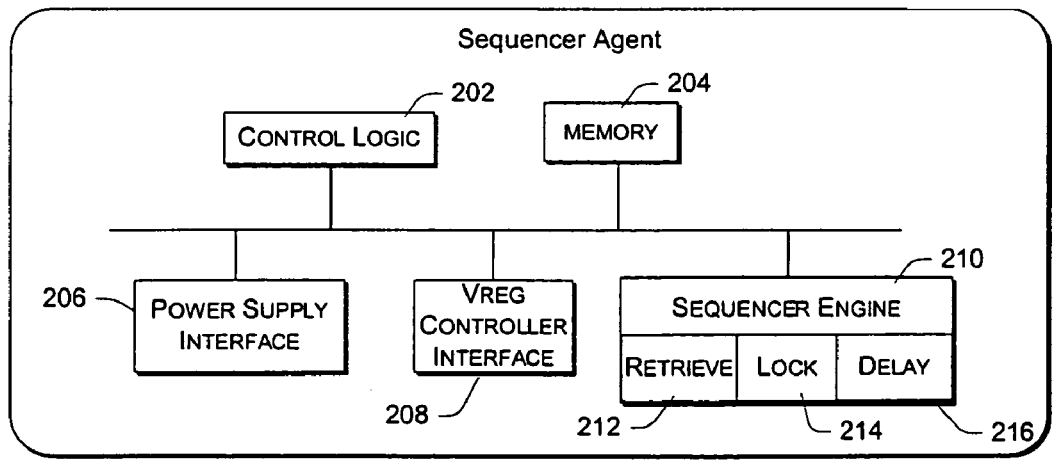
FIG. 2 is a block diagram of an example sequencer agent architecture, in accordance with one example embodiment of the invention.

FIG. 2 is a block diagram of an example sequencer agent architecture, in accordance with one example embodiment of the invention. As shown, sequencer agent 110 may include one or more of control logic 202, memory 204, power supply interface 206, voltage regulator controller interface 208, and sequencer engine 210 coupled as shown in FIG. 2. In accordance with one aspect of the present invention, to be developed more fully below, sequencer agent 110 may include a sequencer engine 210 comprising one or more of retrieve services 212, lock services 214, and/or delay services 216. It is to be appreciated that, although depicted as a number of disparate functional blocks, one or more of elements 202-216 may well be combined into one or more multi-functional blocks. Similarly, sequencer engine 210 may well be practiced with fewer functional blocks, i.e., with only delay services 216, without deviating from the spirit and scope of the present invention, and may well be implemented in hardware, software, firmware, or any combination thereof. In this regard, sequencer agent 110 in general, and sequencer engine 210 in particular, are merely illustrative of one example implementation of one aspect of the present invention. As used herein, sequencer agent 110 may well be embodied in hardware, software, firmware and/or any combination thereof.

As introduced above, sequencer agent 110 may have the ability to enable or disable the outputs of voltage regulator controllers in an electronic appliance in a sequence based at least in part on settings stored in non-volatile memory. In one embodiment, sequencer agent 110 may retrieve stored settings that represent delay times to wait before enabling or disabling different voltage regulator controller outputs. In another embodiment, sequencer agent 110 may retrieve ramp rate settings that are used to set the ramp rates of different voltage regulator controller outputs. Sequencer agent 110 may also lock out the power supply while the voltage regulator controller outputs are being changed to avoid unexpected power state changes.

As used herein control logic 202 provides the logical interface between sequencer agent 110 and its host electronic appliance 100. In this regard, control logic 202 may manage one or more aspects of sequencer agent 110 to provide a communication interface to other components of electronic appliance 100, e.g., through power supply interface 206 and voltage regulator controller interface 208.

According to one aspect of the present invention, though the claims are not so limited, control logic 202 may receive event indications such as, e.g., a user-initiated power state change request. Upon receiving such an indication, control logic 202 may selectively invoke the resource(s) of sequencer engine 210. As part of an example method for enabling and disabling voltage regulator controllers, as explained in greater detail with reference to FIG. 3, control logic 202 may selectively invoke retrieve services 212 that may retrieve stored settings used in enabling or disabling voltage regulator controllers 114. Control logic 202 also may selectively invoke lock services 214 or delay services 216, as explained in greater detail with reference to FIG. 3, to lock out power supply 116 or to wait a certain amount of time before enabling or disabling voltage regulator controllers 114, respectively. As used herein, control logic 202 is intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like. In some implementations, control logic 202 is intended to represent content (e.g., software instructions, etc.), which when executed implements the features of control logic 202 described herein.

Memory 204 is intended to represent any of a wide variety of memory devices and/or systems known in the art. According to one example implementation, though the claims are not so limited, memory 204 may well include non-volatile memory elements, possibly read only memory (ROM), such as flash memory or electrically erasable programmable ROM (EEPROM), or battery-backed static RAM (SRAM), that retains its contents with little or no power required. Memory 204 may be used to store voltage regulator controller enable and disable delay times, voltages, and ramp rates, for example. In one embodiment, the settings stored may be related to particular power state changes, for example, from various low power states, such as off, sleep, and standby, to an on state and from an on state to various low power states.

Power supply interface 206 provides a path through which sequencer agent 110 can affect with power supply 116. In one embodiment, power supply interface 206 may allow sequencer agent 110 to lock out power supply 116 as part of a method of enabling or disabling voltage regulator controllers 114.

Voltage regulator controller interface 208 provides a path through which sequencer agent 110 can affect voltage regulator controllers 114. In one embodiment, voltage regulator controller interface 208 may allow sequencer agent 110 to enable or disable voltage regulator controllers 114.

As introduced above, sequencer engine 210 may be selectively invoked by control logic 202 to retrieve stored settings for the enabling or disabling of voltage regulator controllers 114, to lock out power supply 116, or to delay the enabling or disabling of voltage regulator controllers 114. In accordance with the illustrated example implementation of FIG. 2, sequencer engine 210 is depicted comprising one or more of retrieve services 212, lock services 214 and delay services 216. Although depicted as a number of disparate elements, those skilled in the art will appreciate that one or more elements 212-216 of sequencer engine 210 may well be combined without deviating from the scope and spirit of the present invention.

Retrieve services 212, as introduced above, may provide sequencer agent 110 with the ability to retrieve settings related to the enabling or disabling of voltage regulator controller 114. In one example embodiment, retrieve services 212 may retrieve settings from memory 204. In another example embodiment, retrieve services 212 may receive settings from other sources external to sequencer agent 110 and store those settings in memory 204.

As introduced above, lock services 214 may provide sequencer agent 110 with the ability to lock out power supply 116. In one example embodiment, lock services 214 may lock and unlock power supply 116 as part of a method of enabling and disabling voltage regulator controllers 114, for example, as described in reference to FIG. 3.

Delay services 216, as introduced above, may provide sequencer agent 110 with the ability to delay the enabling or disabling of voltage regulator controllers 114. In one embodiment, delay services 216 may act as a timer to countdown delay times before sequencer agent 110 enables or disables voltage regulator controllers 114. In another example embodiment, delay services 216 may include separate timers for each voltage regulator controller 114.

Figure 3:
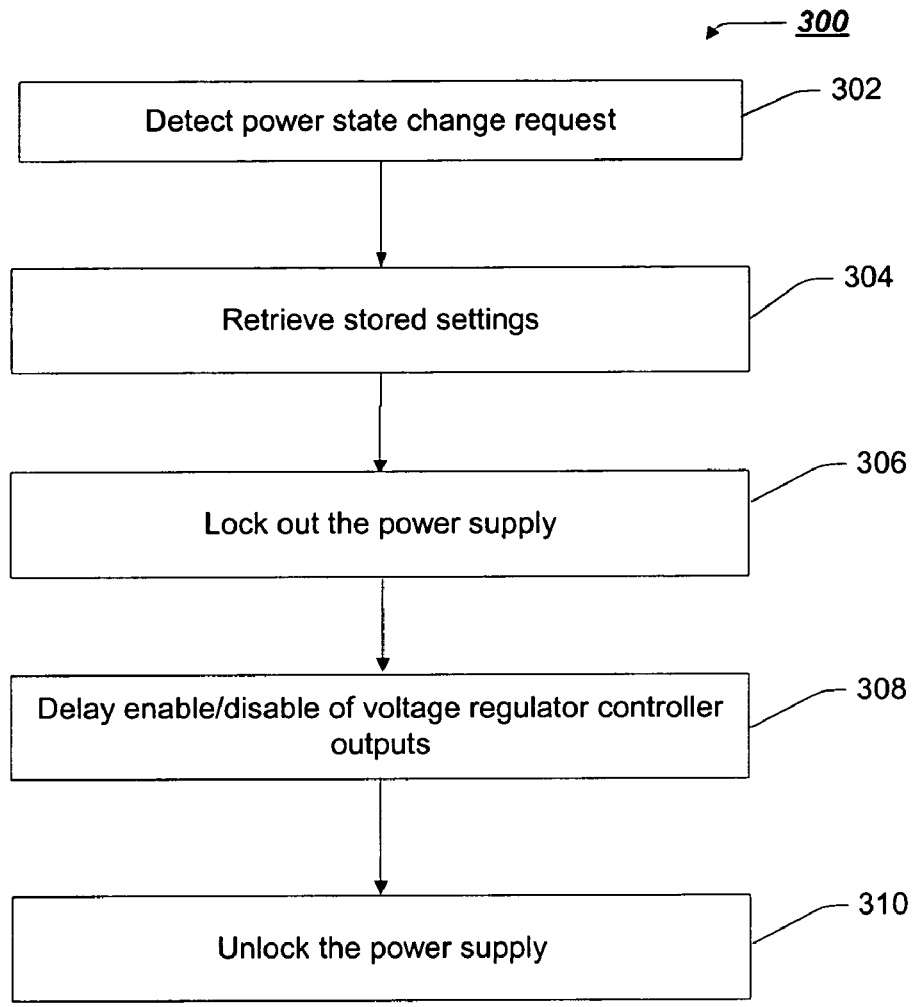
FIG. 3 is a flow chart of an example method for enabling and disabling voltage regulator controllers, in accordance with one example embodiment of the invention.

FIG. 3 is a flow chart of an example of a general method for enabling and disabling voltage regulator controllers, in accordance with one example embodiment of the invention. Although the following operations may be described as a sequential process, many of the operations may in fact be performed in parallel or concurrently. In addition, the order of the operations may be re-arranged without departing from the spirit of embodiments of the invention.

According to but one example implementation, the method of FIG. 3 begins with sequencer agent 110 detecting (302) a power state change request (e.g., a user-initiated power state change). In one example embodiment, the power state change may be from a low power state, such as off, sleep, or standby, to an on state, which requires the enabling of voltage regulator controllers 114. In another example embodiment, the power state change may be from an on state to a low power state, which requires the disabling of voltage regulator controllers 114.

Next, control logic 202 may selectively invoke retrieve services 212 to retrieve (304) stored settings. In one example embodiment, retrieve services 212 may retrieve delay times for each voltage regulator controller 114 from memory 204. In another example embodiment, retrieve services 212 may also retrieve voltage and ramp rate settings. In another embodiment, retrieve services 212 may receive settings from an external source for use in a future power state change.

Control logic 202 may then selectively invoke lock services 214 to lock (306) power supply 116 when electronic appliance 100 is transitioning to a different power state.

Next, delay services 216 may delay (308) the enabling or disabling of the outputs of voltage regulator controllers 114. In one embodiment, delay services 216 may individually enable or disable voltage regulator controllers 114 after expiration of a timer that was set with a delay time for that particular voltage regulator controller 114.

Then, lock services 214 may unlock (310) power supply 116 when the outputs of voltage regulator controllers 114 are stable.

Figure 4:
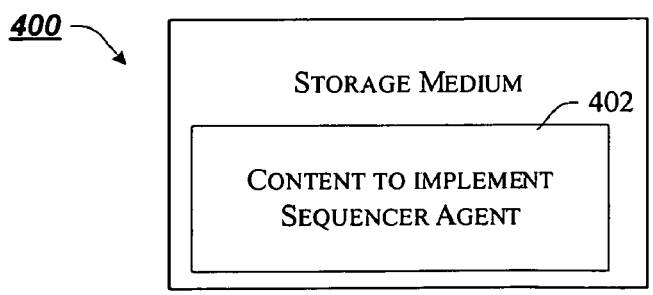
FIG. 4 is a block diagram of an example article of manufacture including content which, when accessed by a device, causes the device to implement one or more aspects of one or more embodiment(s) of the invention.

FIG. 4 illustrates a block diagram of an example storage medium comprising content which, when accessed, causes an electronic appliance to implement one or more aspects of the sequencer agent 110 and/or associated method 300. In this regard, storage medium 400 includes content 402 (e.g., instructions, data, or any combination thereof) which, when executed, causes the appliance to implement one or more aspects of sequencer agent 110, described above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

The invention is not restricted to the particular details described herein. Indeed, many other variations of the foregoing description and drawings may be made within the scope of the present invention. Accordingly, it is the following claims including any amendments thereto that define the scope of the invention.

What is claimed is:

1. An electronic appliance, comprising:
   a power supply;
   an electronic circuit board coupled with the power supply; and
   a sequencer engine coupled with the electronic circuit board, the sequencer engine to sequentially enable voltage regulator controllers on the electronic circuit board during a power up based at least in part on settings stored in non-volatile memory, the sequencer engine to retrieve delay times for a future power state change, and the sequencer engine to prevent the power supply from changing states until voltage regulator controller outputs are stable.

2. The electronic appliance of claim 1, further comprising:
   the sequencer engine to sequentially disable voltage regulator controllers on the electronic circuit board during a power down based at least in part on settings stored in non-volatile memory.

3. An apparatus, comprising:
   a non-volatile memory interface;
   a power supply interface;
   a voltage regulator controller interface; and
   control logic coupled with the non-volatile memory, power supply and voltage regulator controller interfaces, the control logic to retrieve delay times from non-volatile memory, to enable voltage regulator controller outputs at expiration of associated delay times in response to a power up request, and to prevent a power supply from changing states until the voltage regulator controller outputs are stable.

4. The apparatus of claim 3, further comprising control logic to disable voltage regulator controller outputs at expiration of associated delay times in response to a power down request.

5. The apparatus of claim 3, further comprising control logic to retrieve ramp rate settings from non-volatile memory and to set voltage regulator controller output ramp rates.

6. The apparatus of claim 3, further comprising control logic to retrieve delay times for a future power state change.

* * * * *